(12) United States Patent
Maillard et al.

(10) Patent No.: US 7,729,057 B2
(45) Date of Patent: Jun. 1, 2010

(54) USE OF BROMINE ANIONS IN AN OPTICAL ELECTROWETTING DEVICE

(75) Inventors: Mathieu Maillard, Lyons (FR); Geraldine Malet, Villeurbanne (FR); Franck Amiot, Annemasse (FR)

(73) Assignee: Varioptic S.A., Lyons (FR)

( * ) Notice: Subject to any disclaimer, the term of this patent is extended or adjusted under 35 U.S.C. 154(b) by 466 days.

(21) Appl. No.: 11/700,091

(22) Filed: Jan. 31, 2007

(65) Prior Publication Data

US 2007/0179201 A1 Aug. 2, 2007

Related U.S. Application Data

(60) Provisional application No. 60/763,890, filed on Feb. 1, 2006.

(30) Foreign Application Priority Data

Feb. 1, 2006 (EP) .................... 06356009

(51) Int. Cl.
*G02B 1/06* (2006.01)
(52) U.S. Cl. ..................................... 359/665
(58) Field of Classification Search .................. 359/665, 359/666

See application file for complete search history.

(56) References Cited

U.S. PATENT DOCUMENTS

2007/0041101 A1* 2/2007 Goosey et al. .............. 359/676

FOREIGN PATENT DOCUMENTS

WO 2004/099845 A1 11/2004

OTHER PUBLICATIONS

Morton III, S.A., Keffer, D.J., Counce, R.M., and DePaoli, D.W.: "Behavior of Oil Droplets on an Electified Solid Metal Surface Immersed in Ionic Surfactant Solutions," Langmuir, vol. 21, No. 5, Mar. 1, 2005, pp. 1758-1765.
Berge, B. and Peseux, J.: "Variable focal lens controlled by an external voltage: An application of electrowetting," The European Physical Journal E, Dec. 1, 1999, pp. 159-163.
International Search Report for PCT/IB2007/000215 mailed April 26, 2007, 3 pages.

* cited by examiner

*Primary Examiner*—William C Choi
(74) *Attorney, Agent, or Firm*—Osha • Liang LLP (57) ABSTRACT

The present invention relates to the use of a bromine anion in the conductive fluid of an optical electrowetting device, especially a variable focus optical lens driven by electrowetting. The invention also pertains to a multi-phase liquid composition comprising a bromine anion, as well as an optical lens driven by electrowetting comprising the same.

24 Claims, 1 Drawing Sheet

USE OF BROMINE ANIONS IN AN OPTICAL ELECTROWETTING DEVICE

The invention relates to the use of bromine anions in an optical electrowetting device, particularly an optical lens driven by electrowetting containing a multi-phase liquid. The invention also relates to an optical electrowetting device, particularly an optical lens driven by electrowetting containing a conductive fluid comprising bromine anions, and a non conductive fluid which is immiscible into said conductive fluid.

Optical electrowetting devices are devices capable of modifying an incident beam to achieve a specific optical function. They include variable focus liquid lenses, optical diaphragms, optical zooms, ophthalmic devices and are increasingly proposed in a number of applications and apparatuses, such as for example cameras, cell phones, telemeters, endoscopes, dental videos and the like.

Figure 1:
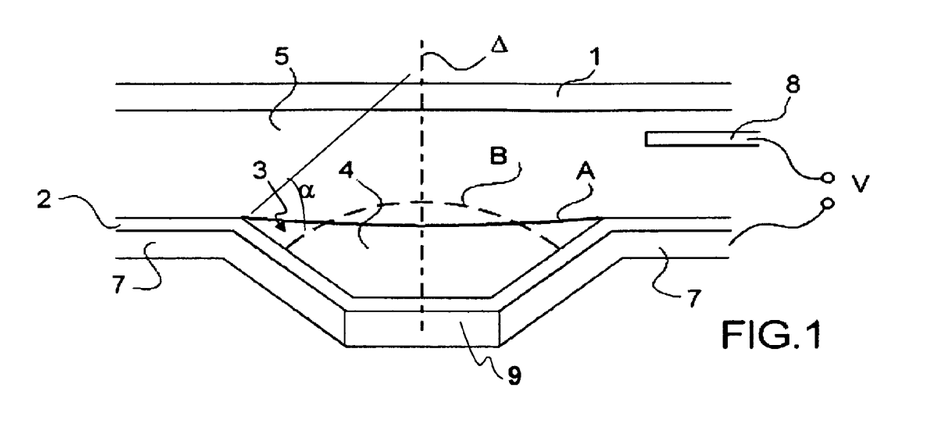
FIG. 1 is a simplified cross-section view of a variable-focus liquid lens according to the invention.
Figure 2:
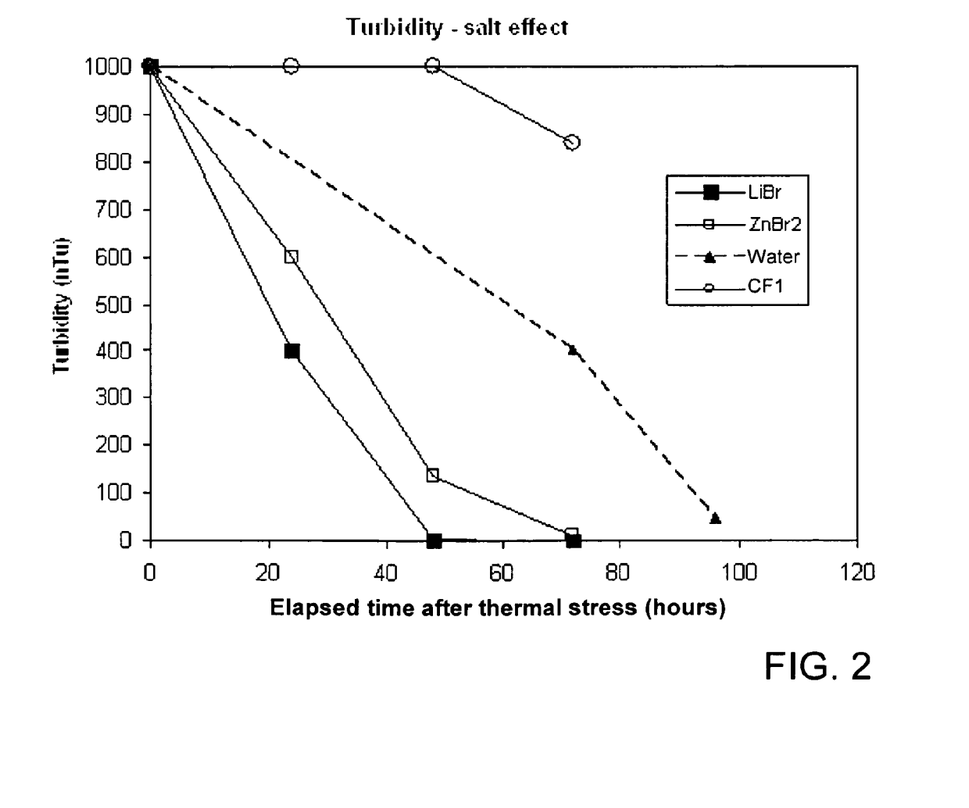
FIG. 2 illustrates the effect on the turbidity of the non-conducting fluid, depending on the types of salts used in the conducting fluid.

An optical lens driven by electrowetting and of variable focal length is described for example in European Patent EP-B1-1,166,157, the content of which is incorporated herein by reference. FIG. 1 of the present application corresponds to FIG. 12 of that patent. A cell is defined by a fluid chamber comprising a lower plate 7,9 and an upper plate 1, and a perpendicular (normal to), or substantially perpendicular (normal to), axis Δ. The lower plate, which is non-planar, comprises a conical or cylindrical depression or recess 3, which contains a non-conductive or insulating fluid 4. The remainder of the cell is filled with an electrically displaceable conductive fluid 5 along the axis Δ.

The fluids are non-miscible, in contact over a meniscus (A, B), and have a different refractive index and substantially the same density. The cell comprises an electrical insulating substrate 2, arranged on at least an area of the lower plate, on which both fluids are in contact.

The thickness of the insulating substrate is preferably comprised between about 0.1 μm and about 100 μm. Generally, small thickness is to be used for optical electrowetting devices working at low voltage, whereas thick insulating substrate is used for high voltage applications.

On FIG. 1, the insulating substrate covers the entire lower plate, but it may be limited to an area of the lower plate on which both fluids are in contact. A first electrode is separated from the conductive fluid and the insulating fluid by the insulating substrate. In this example, the lower plate comprises a conductive body 7 acting as the first electrode and a transparent window 9 for the passage of the beam of light. The conductive body in FIG. 1 is used for the centering of the non conductive liquid. Another electrode 8 is in contact with the conductive fluid. The wettability of the insulating substrate by the conductive fluid varies under the application of a voltage V between the first and the second electrodes, such that through electrowetting phenomena it is possible to modify the shape of the meniscus, depending on the voltage V applied between the electrodes. Thus, a beam of light passing through the cell normal to the plates in the region of the drop will be focused to a greater or lesser extent according to the voltage applied. Voltage V may be increased from 0 volt to a maximum voltage, which depends on the used materials. For example, when the voltage increases, the non-conducting liquid drop 4 deforms to reach a limiting position (designated as B). While drop 4 deforms from its position A (rest position, without tension, concave interface with conductive fluid 5) to its position B (convex interface with conductive fluid 5), the focus of the liquid lens varies.

The conductive fluid generally is a salt containing-aqueous fluid. The insulating fluid is typically an oil, an alkane or a mixture of alkanes, possibly halogenated.

The optical quality of an optical electrowetting device may vary in the conditions of use, depending on various parameters.

It has now been found that the conductive fluid must meet specific criteria in order to provide a very performing lens to be used as a variable focus liquid lens, optical diaphragm, optical zoom and any other optical device using electrowetting in an inside or outside environment. The conductive fluid must also be as compatible as possible with both the non conductive fluid and the insulating plates and side walls encasing said optical electrowetting device.

WO 2004/099845 discloses an electrowetting module containing a conducting and/or polar fluid comprising water and a chlorine salt.

In B. Berge et al. (*Eur. Phys. J. E.*, 3, (2000), 159-163) is disclosed an optical lens driven by electrowetting, wherein the conductive fluid is sodium sulfate in water.

The constant development of still more and more efficient optical electrowetting devices has led the inventors to consider the following aspects which should be considered for use in an optical electrowetting device, especially a variable focus lens driven by electrowetting:

- optical properties, such as transparency, are substantially constant over a wide range of temperature;
- transparency is recovered, upon and after thermal stress, within an as short as possible period of time;
- solubility of the components, such as salts in the conductive fluid is substantially constant over a wide range of temperature, especially at low temperatures;
- both the conductive fluid and non-conductive fluid are non corrosive towards the plates and side-walls of the device, typically towards glass, stainless steel;

The objectives of the present invention are therefore to provide an optical electrowetting device, especially a variable optical lens driven by electrowetting, which meets at least one, preferably at least two, more preferably at least three, most preferably all, of the above listed aspects.

The inventors have now discovered that these and other objectives are met in whole or in part with the use according to the present invention.

In a first aspect, the invention relates to the use of a bromine anion in the conductive fluid of an optical electrowetting device, especially an optical lens driven by electrowetting.

The invention also relates to a method of preparing an optical electrowetting device, especially an optical lens driven by electrowetting, comprising using a bromine anion in the conductive fluid of said optical electrowetting device.

More particularly, the electrical conductive fluid comprises water and at least one bromine anion of any type. The source of the anion is any organic or inorganic, preferably inorganic, ionic or ionizable bromine salt.

In the following specification, "ionic salts" refers to salts that are totally or substantially totally dissociated (as a bromine anion and a cation) in water. "Ionizable salts" refers to salts that are totally or substantially totally dissociated in water, after chemical, physical or physico-chemical treatment.

In the present specification and claims, the words "comprise/comprising" are synonymous with (means the same thing as) "include/including," "contain/containing", are inclusive or open-ended and do not exclude additional, unrecited elements.

According to one aspect, the present invention relates to the use of a bromine anion together with a cation in the conductive fluid of an optical electrowetting device, especially an optical lens driven by electrowetting.

Examples of cations include, but are not limited to, alkali, alkaline-earth and metallic cations. Organic and inorganic ionic bromine salts and ionizable bromine salts are thus well known in the art, and examples of these include, but are not limited to alkali bromides and alkaline-earth bromides, such as sodium bromide and/or lithium bromide, as well as zinc bromide, and the like, as well as mixtures thereof.

Mixtures of one or more ionic bromine salts together with one or more bromine ionizable salts are also encompassed by the present invention.

According to a particularly preferred embodiment of the present invention, the salts useful as a source of the bromine anion used in the conductive fluid include, but are not limited to zinc bromide, alkali bromides and alkaline-earth bromides, preferably sodium bromide and/or lithium bromide, lithium bromide being most preferred.

Lithium bromide and sodium bromide are particularly well suited for use in the conductive fluid of an optical electrowetting device, especially an optical lens driven by electrowetting.

Mixtures of bromine anions with other organic or inorganic salts, such as chlorine salts, sulfate salts, acetates, are also encompassed by the present invention, although this does not represent a preferred aspect of the invention.

As already mentioned, the conductive fluid comprises a bromine anion, typically a bromine salt, dissolved in water.

Water to be used in the conductive fluid should be as pure as possible, i.e. free, or substantially free, of any other dissolved components that could alter the optical properties of the optical electrowetting device, optical lens driven by electrowetting.

Ultra pure water is most preferably used.

The concentration of the bromine anion in the conductive fluid may vary in large proportions, keeping in mind a too high concentration may result in undesirable increase of density, refractive index, optical dispersion.

By way of example, when the source of bromine anion used is lithium bromide (LiBr), a suitable concentration of LiBr in the conductive fluid is comprised between about 0.5 weight % and about 25 weight %, advantageously between about 1.0 weight % and about 20 weight %, preferably between about 1.0 weight % and about 15 weight %, typically between about 1.5 weight % and about 10 weight %.

The use of bromine anion according to the invention in a conductive fluid for an optical electrowetting device, e.g. for an optical lens driven by electrowetting, provides an optical electrowetting device presenting substantially no turbidity upon and after thermal stress, or, when turbidity is present, a relatively rapid recovery of transparency, for example a transparency recovery within less than about 80 hours after a thermal stress of at least about 15 hours, e.g. about 18 hours, at a temperature of about 85° C.

In the present specification, turbidity refers to haze that appears either in the non-conductive fluid or in the conductive fluid or both, upon or after thermal stress.

Turbidity upon or after thermal stress of the fluids is measured using a turbidimeter, as explained in the illustrative examples.

In the present specification, for either or both the conductive and non-conductive fluids, as well as for the optical electrowetting device, transparency is to be understood as a transmission of more than about 96% over a wavelength range of from about 400 nm to about 700 nm and/or a scattering energy of less than about 2% in a 60° (degrees) cone around the direct incidence in the same wavelength range.

According to another feature, the electrical conductive fluid comprises at least one conventional freezing-point lowering agent. As freezing-point lowering agent, mention may be made of alcohol, glycol, glycol ether, polyol, polyether-polyol and the like, or mixtures thereof. Examples thereof include the following agents: ethanol, ethylene glycol (EG), monopropylene glycol (MPG or 1,2-propane diol), 1,3-propane diol, 1,2,3-propane triol (glycerol), and the like, and mixtures thereof.

According to a feature, this agent aims at decreasing the freezing point of the conductive phase which should stay liquid over a range of temperature comprised between about −20° C. and about +70° C.

Bromine salts have been found to lower the freezing point of the conductive fluid. As such, and according to another feature, the freezing-point lowering agent may be the bromine anion, typically the bromine salt, so that any additional freezing-point lowering-agent is not necessary, but still possible if desired.

According to still another feature, the conductive fluid comprises at least one viscosity-controlling agent, namely a viscosity-adjusting agent. The viscosity-adjusting agent that may be used in the invention may be of any type known from the one skilled in the art and may be advantageously an alcohol, a glycol, a glycol ether, a polyol, a poly ether polyol and the like, or mixtures thereof. Examples thereof include the following agents: ethanol, ethylene glycol, monopropylene glycol (MPG), 1,3-propane diol, 1,2,3-propane triol (glycerol), and the like, and mixtures thereof.

In a preferred embodiment, the viscosity-adjusting agent has a molecular weight of less than about 130 g/mol.

The viscosity-adjusting agent may be the same or different from the freezing-point lowering agent. According to a feature, the conductive fluid comprises an agent that is both a freezing-point lowering agent and a viscosity-adjusting agent.

According to still another feature, the conductive fluid advantageously comprises a biocide agent in order to prevent the development of organic elements, such as bacteria, fungi, algae, micro-algae, and the like, which could worsen the optical properties of the optical electrowetting device, particularly in the case of a lens driven by electrowetting.

Such biocide agent may be of any type known in the art, provided, as is the case for the freezing-point lowering agent and the viscosity-adjusting agent, that it does not alter the required optical properties of the conductive fluid (transparency, refractive index, and the like, as mentioned above).

As another object, the present invention relates to a composition comprising water, a bromine anion, typically an organic or inorganic bromine salt, and a freezing-point lowering agent. Preferably said composition also comprises a biocide agent and/or a viscosity-adjusting agent.

In a preferred embodiment, the conductive fluid comprises water, a bromine salt, preferably lithium bromide and/or sodium bromide, a freezing-point lowering agent, preferably MPG, glycerol, or a mixture of MPG and glycerol, and optionally a biocide agent and/or a viscosity-adjusting agent.

According to still a preferred embodiment, the composition of the invention comprises:

about 0.5 weight % to about 25 weight %, advantageously about 1.0 weight % to about 20 weight %, preferably about 1.0 weight % to about 15 weight %, of a bromine anion, preferably a bromine salt;

about 5 weight % to about 60 weight % of a freezing-point lowering agent, preferably about 10 weight % to about 50 weight %;

0 weight % to about 50 weight % of a viscosity-adjusting agent, preferably 0 weight % to about 40 weight %;

0 weight % to about 1 weight % of a biocide agent, preferably 0 weight % to 0.5 weight %; and water in a quantity sufficient to 100 weight %.

As stated above, the conductive fluid comprising a bromine anion may be present together with an immiscible non conductive fluid so as to form a multi-phase liquid composition for use in an optical electrowetting device, e.g. an optical lens driven by electrowetting.

Another aspect of the invention is therefore a multi-phase liquid composition comprising a bromine anion-containing conductive fluid and a non-conductive fluid, the non-conductive fluid being immiscible in the conductive fluid.

The term "immiscible" refers to fluids that are non miscible or substantially non miscible the one into the other.

According to one embodiment, said composition has a mean arithmetic cinematic viscosity of between about 1.5 cSt and about 40 cSt, preferably of between about 1.5 cSt and about 20 cSt, more preferably of between about 3 cSt and about 10 cSt, within a temperature range of about −10° C. to about +60° C., preferably of about −20° C. to about +60° C., more preferably of about −20° C. to about +70° C.

In the present application, the cinematic viscosity is measured following ASTM D7042-04. The resistance of the liquid between a rotor and a stator is determined at the determined temperature, e.g. at about −20° C., −10° C., +60° C. or +70° C. and/or at intermediate values within the range of temperature comprised between about −20° C., −10° C., and +60° C. or +70° C. A viscometer of the type of Anton Paar SVM 3000 may be used, and reference is made to EP-B1-0 926 481, the content of which is hereby incorporated. The content of these documents is hereby incorporated herein by reference. The mean arithmetic cinematic viscosity is the mathematic mean of the cinematic viscosities measured separately for the conductive and non-conductive fluids using the above method.

According to another feature, the difference of viscosity between the conductive fluid and the non-conductive fluid is comprised between 0 cSt and about ±10 cSt, preferentially between 0 cSt and about ±5 cSt, within a temperature range of about −10° C. to about +60° C., preferably of about −20° C. to about +60° C., more preferably of about −20° C. to about +70° C.

According to a feature, the multi-phase liquid composition comprises a non-conductive fluid that is immiscible in the conductive fluid. This said non-conductive fluid comprising an organic or an inorganic (mineral) compound or mixture thereof. Examples of such organic or inorganic compounds include a Si-based monomer or oligomer, a Ge-based monomer or oligomer, a Si—Ge-based monomer or oligomer, a hydrocarbon, or a mixture thereof.

The hydrocarbon may be linear or branched and may contain one or more saturated, unsaturated or partially unsaturated cyclic moiety(ies). The hydrocarbon has advantageously from about 10 to about 35 carbon atoms, preferably from about 15 to about 35 carbon atoms. Hydrocarbons having less than about 10 carbon atoms are less preferred since miscibility into the conductive fluid may occur.

The hydrocarbon may comprise one or more unsaturation(s) in the form of double and/or triple bond(s). More than 2 or 3 double or triple bonds are not preferred considering the risk of decomposition with UV radiations. Preferably the hydrocarbon does not contain any double or triple bonds, in which case the hydrocarbons are referred to as alkanes in the present specification.

The hydrocarbon may further comprise one or more heteroatoms, as substituents and/or as atoms or group of atoms interrupting the hydrocarbon chain and/or ring. Such heteroatoms include, but are not limited to, oxygen, sulfur, nitrogen, phosphor, halogens (mainly as fluorine, chlorine, bromine and/or iodine). Care should be taken that the presence of one or more heteroatom(s) does not impact the immiscibility of the two fluids.

May be used mixtures containing more than about 99.8% of alkanes. These mixtures may contain little amount of aromatic groups and/or unsaturated moieties in a ratio lower than about 1 weight % (preferentially lower than about 0.5%). Chlorine may also be present in said alkane, in a ratio lower than about 10 weight %, preferentially lower than about 7%. Such impurities may be present as sub-product resulting from the preparation of the alkanes, e.g. when they are obtained by distillation process.

According to various features of the present invention, the hydrocarbon is or comprises:

a linear or branched alkane, such as decane ($C_{10}H_{22}$), dodecane ($C_{12}H_{24}$), squalane ($C_{30}H_{62}$), and the like;

an alkane comprising one or more rings, such as tert-butylcyclohexane ($C_{10}H_{20}$), and the like;

a fused ring system, such as α-chloronaphthalene, α-bromonaphthalene, cis,trans-decahydronaphthalene ($C_{10}H_{18}$), and the like;

a mixture of hydrocarbons, such as those available as Isopar® V, Isopar® P (from Exxon Mobil); and the like, and mixtures thereof.

In the present application, an oligomer is a compound having a number of identical (homo-oligomers) or different (co-oligomers) repeating units, of between about 2 and about 20, preferably between about 2 and about 10, and still more preferably between about 2 and about 5. Oligomers having more than about 20 repeating units are less preferred since they may induce an undesirable increase of viscosity at low temperature.

The non-conductive fluid may contain one or several of the following silicon-based species:

a siloxane of the formula 1a, 1b or 1c:

wherein each of R1, R2 and R' independently represents alkyl, (hetero)aryl, (hetero)arylalkyl, (hetero)arylalkenyl or (hetero)arylalkynyl and n is comprised between about 1 and about 20, preferably between about 1 and about 10, more preferably n is 1, 2, 3, 4 or 5 and with the precision that n is greater than 2 in formula 1c;

a silane of formula 2:

wherein R1, R2 and R' are as defined above and m is comprised between about 1 and about 20, preferably between about 1 and about 10, more preferably m is 1, 2 or 3;

a monosilane of formula 3:

wherein R1 and R2 are as defined above, and each of R3 and R4 independently represents alkyl, (hetero)aryl, (hetero)arylalkyl, (hetero)arylalkenyl or (hetero)arylalkynyl.

In the above formulae:
alkyl means a straight or branched alkyl radical having from about 1 to about 10 carbon atoms, preferably from about 1 to about 6 carbon atoms; preferred alkyl includes methyl, ethyl, n-propyl, iso-propyl; alkyl radical may be halogenated, for instance may comprise a 1,1,1-trifluoropropyl group;

(hetero)aryl means an aromatic or heteroaromatic radical containing from about 5 to about 12 atoms, forming at least one, preferably one, aromatic and/or heteroaromatic ring, said ring(s) being optionally substituted by one or more halogens, preferably 1, 2 or 3 halogen atoms (mainly fluorine, chlorine and/or bromine), and being optionally fused with one or more saturated, partially saturated or unsaturated ring system; preferred (hetero) aryl is phenyl or naphthyl, optionally substituted with 1, 2 or 3 halogen atoms;

(hetero)arylalkyl is as defined above for each of the alkyl and (hetero)aryl radical; preferred (hetero)arylalkyls include benzyl, phenethyl, optionally substituted with 1, 2 or 3 halogen atoms;

(hetero)arylalkenyl and (hetero)arylalkynyl correspond to radicals wherein the (hetero)aryl moiety is as defined above, and alkenyl and alkynyl represent a straight or branched alkyl radical, as defined above, further comprising one or more, preferably one, double bond or one or more, preferably one, triple bond, respectively.

According to a preferred embodiment, in the above formulae 1a, 1b and 2, all R' are identical or different and are preferably methyl or halogenated alkyls;

According to a further preferred embodiment, in the above formulae 1a, 1b and 2, all R' are the same, more preferably each R' is methyl.

The non-conductive fluid may contain one or several of the following specific silicon-based species:
hexamethyldisilane, diphenyldimethylsilane, chlorophenyltrimethylsilane, phenyltrimethyl-silane, phenethyltris(trimethylsiloxy)silane, phenyltris(trimethylsiloxy)silane, polydimethylsiloxane, tetraphenyltetramethyltrisiloxane, poly(3,3,3-trifluoropropylmethylsiloxane), 3,5,7-triphenylnonamethylpentasiloxane, 3,5-diphenyloctamethyltetrasiloxane, 1,1,5,5-tetraphenyl-1,3,3,5-tetramethyltrisiloxane, and hexamethylcyclotrisiloxane.

According to another feature, the non-conductive fluid may contain one or several of the following germane based species:
germanoxane of formula 4
germane of formula 5
germane of formula 6 wherein R', R1, R2, R3, R4 and n are as defined above.

The non-conductive fluid may contain one or several of the following specific germane based species: hexamethyldigermane, diphenyldimethylgermane, phenyltrimethyl-germane.

According to still another feature, the non-conductive fluid comprises at least one Si- and/or Ge-based compound substituted by one or more phenyl groups and/or other groups like fluorinated or non fluorinated alkyl (ethyl, n-propyl, n-butyl), linear or branched alkyls, chlorinated or brominated phenyl groups, benzyl groups, halogenated benzyl groups; or a mixture of Si- and/or Ge-based compounds wherein at least one compound is substituted by one or more phenyl groups and/or other groups like fluorinated or non fluorinated alkyl (ethyl, n-propyl, n-butyl), linear or branched alkyls, chlorinated or brominated phenyl groups, benzyl groups, halogenated benzyl groups.

In a preferred embodiment, when the non-conductive fluid comprises a siloxane compound, especially an aryl siloxane compound, said compound is such that the ratio of the total number of aryl, e.g. phenyl, radicals or groups to the total number of Si atoms is equal to or less than about 1.33, preferably equal to or less than 1, and more preferably equal to or less than about 0.8.

In still another aspect, the invention relates to the use of a Si- and/or Ge-based compound substituted by one or more phenyl groups or of a mixture of Si- and/or Ge-based compounds wherein at least one compound is substituted by one or more phenyl groups, in the non-conductive fluid of an optical lens driven by electrowetting. For siloxane compounds, especially aryl siloxane compounds, the ratio of the total number of aryl, e.g. phenyl, radicals or groups to the total of Si atoms is equal to or less than about 1.33, preferably less than about 1, and more preferably less than about 0.8.

Si-based compounds containing a ratio of aryl, e.g. phenyl radicals or groups to Si atoms greater than about 1.33 can become hazy after thermal stress when they are in the presence of the aqueous conductive fluid. Turbidity value for such oils is usually higher than about 1000 NTU. Using selected siloxanes or silanes where the number ratio of phenyl groups to Si is equal to or less than about 1.33, preferably, less than about 1, and more preferably less than about 0.8, leads to a decrease of turbidity to less than about 200 NTU, which is an acceptable value for use in optical electrowetting devices, such as optical lenses.

Turbidity, or haze, is generally not observed, or is below about 1 NTU, after thermal stress, when the non-conductive phase is, or comprises, a hydrocarbon, typically an alkane.

Thus in an aspect, the invention features a multi-phase composition comprising a conductive fluid and a non-conductive fluid that is immiscible in the conductive fluid, wherein the non-conductive fluid comprises a Si- and/or Ge-based compound substituted by one or more phenyl groups or a mixture of Si- and/or Ge-based compounds wherein at least one compound is substituted by one or more phenyl groups. For siloxane compounds, especially aryl siloxane compounds, the ratio of the total number of aryl, e.g. phenyl, radicals or groups to the total of Si atoms is equal to or less than about 1.33, preferably less than about 1, and more preferably less than about 0.8.

In still another aspect, the invention features an optical electrowetting device, especially an optical lens driven by electrowetting, comprising a conductive fluid and a non-conductive fluid that is immiscible in the conductive fluid, wherein the non-conductive fluid comprises a Si- and/or Ge-based compound substituted by one or more phenyl groups or a mixture of Si- and/or Ge-based compounds wherein at least one compound is substituted by one or more phenyl groups. For siloxane compounds, especially aryl siloxane compounds, the ratio of the total number of aryl, e.g. is phenyl, radicals or groups to the total of Si atoms is equal to or less than about 1.33, preferably less than about 1, and more preferably less than about 0.8.

According to another feature of the present invention, the non-conductive fluid comprises a wetting agent to increase the wettability of said fluid on the lower plate (isolating substrate) of the lens. The nature of the wetting agent will depend on the nature of the lower plate surface of said lens.

Still according to another feature, the organic or inorganic (mineral) compound or mixture thereof that is the primary component of the non-conductive fluid may itself have wetting properties with respect to the substrate or the coating, as is for example the case with aryl mono germane compounds as described above, or may comprise a component that presents this property. The organic or inorganic (mineral) compound may thus itself be the wetting agent when a specific substrate or coating is used.

Examples of organic or inorganic (mineral) compounds—and/or of wetting agents, specifically on Parylene®, or other non-conductive (isolating) layer or coating having a high surface energy (>30 mN/m)—are presented in Tables 1, 2 and 3 below:

TABLE 1

| Compound | Density at 20° C. (g/cm3) | Refractive index at 589.3 nm at 20° C. | Viscosity at 20° C. (cSt) | Surface tension at 20° C. (mN/m) |
|---|---|---|---|---|
| 1-Bromononane | 1.0895 | 1.4545 | 1.9 | 28.69 |
| 1,2-Dibromohexane | 1.5812 | 1.5026 | 1.7 | 30.52 |
| Bromocyclohexane | 1.3347 | 1.4954 | 1.8 | 31.57 |
| 1-Chloro-2-methyl-2-phenylpropane | 1.0423 | 1.5244 | 3.3 | 34.36 |
| 1,9-Dichlorononane | 1.0102 | 1.4599 | 3.9 | 34.49 |
| 1,8-Dichlorooctane | 1.0261 | 1.4592 | 3.2 | 34.52 |
| 1,10-Dichlorodecane | 0.9966 | 1.4609 | 4.8 | 34.54 |
| Cycloheptylbromide | 1.3085 | 1.5045 | 2.4 | 35.05 |

TABLE 1-continued

| Compound | Density at 20° C. (g/cm3) | Refractive index at 589.3 nm at 20° C. | Viscosity at 20° C. (cSt) | Surface tension at 20° C. (mN/m) |
|---|---|---|---|---|
| 1-Chloro-3-phenylpropane | 1.0478 | 1.5222 | 2.4 | 35.94 |
| 2-phenylethylbromide | 1.37 | 1.5573 | 2.3 | 37.69 |
| 1,8-Dibromooctane | 1.4657 | 1.4993 | 4.1 | 37.73 |
| 1-Bromo-3-phenylpropane | 1.3127 | 1.545 | 2.7 | 37.92 |
| 1,6-Dibromohexane | 1.608 | 1.5073 | 2.7 | 38.39 |
| 1,9-Dibromononane | 1.4115 | 1.4964 | 4.9 | 39 |
| 1,1,2-Tribromoethane | 2.61 | 1.593 | 1.63 | 43.16 |

TABLE 2

| Compound | Density at 20° C. (g/cm3) | Refractive index at 589.3 nm at 20° C. | Viscosity at 20° C. (cSt) | Surface tension at 20° C. (mN/m) |
|---|---|---|---|---|
| Cyclohexylbenzene | 0.9424 | 1.5258 | 3.0 | 30.62 |
| 1,2-Dichlorobenzene | 1.3061 | 1.5514 | 1.1 | 31.56 |
| 1-Chloro-2-fluorobenzene | 1.2405 | 1.5010 | 0.8 | 31.82 |
| 2-Chloro-1,4-dimethylbenzene | 1.056 | 1.5235 | 1.0 | 31.9 |
| Chlorobenzene | 1.1066 | 1.5248 | 0.7 | 32.63 |
| 1-Bromo-4-propylbenzene | 1.286 | 1.5363 | 1.6 | 33.15 |
| 1-Bromo-4-ethylbenzene | 1.3395 | 1.5446 | 1.1 | 33.65 |
| Bromobenzene | 1.4964 | 1.5597 | 0.8 | 33.99 |
| 1-Phenyl-1-cyclohexene | 0.99 | 1.5684 |  | 37.25 |
| Cyclopropyl phenyl sulfide | 1.0619 | 1.5823 | 2.7 | 38.43 |
| 4-Chlorodiphenyl ether | 1.1916 | 1.5885 | 4.7 | 39.13 |
| Thioanisole | 1.0584 | 1.5870 | 1.5 | 39.23 |
| Phenyl sulfide | 1.1123 | 1.6328 | 4.3 | 41.36 |
| 4-Bromodiphenyl ether | 1.4213 | 1.6082 | 5.9 | 42.12 |
| 2-Fluorobenzophenone | 1.1853 | 1.5856 | 17.8 | 42.44 |
| 1-Bromonaphtalene | 1.4889 | 1.6582 | 3.7 | 43.57 |
| 2-Bromothioanisole | 1.542 | 1.6338 | 3.3 | 44.58 |

TABLE 3

| Compound | Density at 20° C. (g/cm3) | Refractive index at 589.3 nm (20° C.) |
|---|---|---|
| Diphenyldimethylgermane | 1.18 | 1.573 |
| Phenyltrimethylgermane | 1.11 | 1.505 |
| Diphenyldimethylsilane | 0.99 | 1.561 |

Examples of organic or inorganic (mineral) compounds—and/or of wetting agents specifically on Teflon® AF or other isolating layer or coating having a low surface energy (<30 mN/m)—are presented in the following Tables 4 (siloxanes) and 5 (other compounds):

TABLE 4

| Compound | Density at 20° C. (g/cm3) | Refractive index at 589.3 nm at 20° C. | Viscosity at 20° C. (cSt) | Surface tension at 20° C. (mN/m) |
| --- | --- | --- | --- | --- |
| 3,5-Diphenyloctamethyl-tetrasiloxane | 0.9759 | 1.4772 | 6.7 | 23.92 |
| Baysilone M 5 (Bayer) | 0.9162 | 1.3982 | 5.4 | 18.41 |
| Baysilone PK 20 (Bayer) | 0.9822 | 1.4609 | 21.5 | 22.05 |
| Siloxane DC200/0.65 (Dow Corning) | 0.7634 | 1.3772 | 0.6 | 15.57 |
| Siloxane DC200/10 (Dow Corning) | 0.9392 | 1.4010 | 10.7 | 18.38 |
| Siloxane DC200/5 (Dow Corning) | 0.9168 | 1.3980 | 5.6 | 18.61 |
| Siloxane DC702 (Dow Corning) | 1.0916 | 1.5181 | 62.2 | 28.45 |
| Siloxane DC FS1265 (Dow Corning) | 1.2509 | 1.3814 | 410.3 | 21.56 |
| DES T11 (ABCR) | 0.9468 | 1.4330 | 6.3 | 23.85 |
| DMS-T02 (ABCR) | 0.8978 | 1.3955 | 3.3 | 18.2 |
| Hexamethyldisilane | 0.71 | 1.4226 |  | 20.56 |
| PMM-0011 (ABCR) | 0.979 | 1.4806 | 6.5 | 23.32 |
| poly(Dimethylsiloxane-co-diphenylsiloxane), 550 | 1.0643 | 1.4977 | 148.8 | 24.73 |
| poly(Dimethylsiloxane-co-diphenylsiloxane), dihydroxy terminated | 1.0477 | 1.4717 | 71.3 | 21.89 |
| Rhodorsil 47V10 (Rhodia) | 0.9376 | 1.4007 | 10.6 | 19.16 |
| Rhodorsil 550 (Rhodia) | 1.068 | 1.5008 | 192.5 | 21.32 |
| Rhodorsil 604V50 (Rhodia) | 0.9623 | 1.4039 | 53.5 | 20.13 |
| SIB 1816.0 (ABCR) | 1.4772 | 1.3383 | 9.7 | 18.73 |
| FMS 121 | 1.224 | 1.3810 | 125.6 | 21.73 |

TABLE 5

| Compound | Density at 20° C. (g/cm3) | Refractive index at 589.3 nm at 20° C. | Viscosity at 20° C. (cSt) | Surface tension at 20° C. (mN/m) |
| --- | --- | --- | --- | --- |
| 1,3,5-Triisopropylbenzene | 0.84 | 1.4886 | 4.9 | 26.87 |
| 1,3-Diisopropylbenzene | 0.8559 | 1.4887 | 1.7 | 27.28 |
| 1-bromo-2,5-difluorobenzene | 1.708 | 1.5087 |  | 25.75 |
| 1-bromo-4-butylbenzene | 1.2399 | 1.5301 | 2.0 | 23.59 |
| 1-Bromododecane | 1.0355 | 1.4580 | 3.8 | 27.65 |
| 1-chlorooctane | 0.873 | 1.4303 | 1.4 | 26.74 |
| 1-Chlorotetradecane | 0.8652 | 1.4468 | 5.1 | 29.62 |
| 2-bromododecane | 1.02 | 1.4576 |  | 25.28 |
| cis,trans-decahydronaphthalene | 0.881 | 1.4740 | 2.9 | 28.54 |
| Cyclohexane | 0.7786 | 1.4261 | 1.2 | 25 |
| Dodecane | 0.753 | 1.4218 |  | 24.53 |
| Heptane | 0.684 | 1.3876 | 0.5 | 20.27 |
| Hexane | 0.6597 | 1.3748 | 0.3 | 18.05 |
| Isopar P | 0.8001 | 1.4442 | 4.2 | 25.24 |
| Nonane | 0.7178 | 1.4054 | 0.9 | 22.5 |
| Octane | 0.7029 | 1.3974 | 0.7 | 21.39 |
| o-Xylene | 0.88 | 1.5048 | 0.9 | 26.94 |
| p-Xylene | 0.8611 | 1.4958 | 0.7 | 27.6 |
| Undecane | 0.7406 | 1.4171 | 1.5 | 23.93 |
| 1,1,1,5,5,5-Hexafluoroacetylacetone | 1.47 | 1.3342 |  | 14.74 |
| Bromopentafluorobenzene | 1.9442 | 1.4493 | 0.8 | 25.53 |
| Fluorinated HFE 7200 (3M) | 1.4338 |  | 0.5 | 14.38 |
| FC-40 (3M) | 1.8839 |  | 2.9 | 16.38 |
| FC-75 (3M) | 1.7735 |  | 0.9 | 14.35 |
| Perfluoropolyether Galden HT230 (Solvaysolexis) | 1.8295 |  | 5.8 | 15.49 |
| Perfluoropolyether Galden HT270 (Solvaysolexis) | 1.8612 |  | 17.5 | 16.43 |
| 1-Fluorooctane | 0.8123 | 1.3953 | 1.0 | 23.77 |

Among the wetting agents, those of formula (I) or of formula (II) or a mixture thereof are preferred for use on an insulating layer having a high surface energy (>about 30 mN/m), such as Parylene® for example:

$$X^1-A-X^2; \quad (I)$$

(II)

wherein:
X, $X^1$ and $X^2$ are halogen atoms (mainly fluorine, chlorine and/or bromine);
A is linear or branched ($C_4$-$C_{20}$)alkylene, optionally substituted by halogen atom(s), and optionally comprising one or more, preferably one, double bond, and/or one or more, preferably one, triple bond;
Ak is $C_1$-$C_{10}$ alkyl, preferably $C_1$-$C_6$ alkyl, such as methyl, ethyl, propyl, and linear or branched butyls, pentyls and hexyls;
p and q are each chosen from 1, 2, 3, 4 or 5, provided that p+q is 2, 3, 4, 5 or 6.
Preferably, X, $X^1$ and $X^2$ are independently Cl or Br. Ak preferably represents ethyl.

Examples of formula (I) include the compounds listed in Table 1 above. Examples of formula (II) include the compounds listed in Table 2 above.

Among the wetting agents, those of formula (III) or of formula (IV) or a mixture thereof are appropriate embodiments on an insulating layer having a high surface energy (>about 30 mN/m), such as Parylene® for example:
(III) Siloxane having a ratio of phenyl groups to silicon atom below 1,
(IV) $X^3$-$A_n$,
wherein
$X^3$ is halogen (preferably fluorine, chlorine or bromine) or hydrogen; and
$A_n$ is a linear or branched hydrocarbon or fluorinated hydrocarbon having n carbon atoms, n being equal to or greater than about 2 and equal to or smaller than about 20 and preferably equal to or greater than about 2 and equal to or smaller than about 10.

Compounds of formula (I) and of formula (II) show a good resistance to hydrolysis when in contact with an aqueous conductive fluid, and are particularly suitable wetting agents.

The wetting agent may be a monohalogenated aromatic compound, a α,ω-dihalogenated alkyl compound or a mixture thereof. In a preferred embodiment, the non-conductive fluid comprises 1-bromo-4-ethylbenzene, α,ω-dichlorooctane or a mixture thereof as a wetting agent.

In a preferred embodiment, the non-conductive fluid comprises α,ω-dichlorooctane as hydrolysis-resistant wetting agent.

In another preferred embodiment, the non-conductive fluid comprises 1-bromo-4-ethylbenzene as hydrolysis-resistant wetting agent.

In still another aspect, the invention relates to a multi-phase liquid composition comprising a conductive fluid and a non-conductive fluid, each of said fluids presenting substantially the same density, the non-conductive fluid being immiscible in the conductive fluid and comprising at least one Si- and/or Ge-based compound, and at least one hydrolysis-resistant compound of formula (I) or of formula (II) as herein above described.

In still another aspect, the invention relates to a liquid composition comprising a Si-based compound, a Ge-based compound, a Si—Ge-based compound, or a mixture thereof and at least one hydrolysis-resistant compound chosen from compound of formula (I) and compound of formula (II) as described above, preferably α,ω-dichlorooctane.

The invention features the use of a compound of formula (I), preferably α,ω-dichloro-octane, in an optical electrowetting device, especially an optical lens driven by electrowetting, as hydrolysis-resistant compound.

The invention also features the use of a compound of formula (II), preferably 1-bromo-4-ethylbenzene, in an optical electrowetting device, especially an optical lens driven by electrowetting, as hydrolysis-resistant compound.

One or more of the following features may also be included:
the non-conductive fluid further comprises an anti-oxidant,
the non-conductive fluid further comprises a biocide compound, which may be the same as, or different from, the biocide optionally present in the conductive fluid,
the non-conductive fluid and/or the conductive fluid comprise(s) a UV-filtering agent to prevent the fluid components from any undesirable decomposition when exposed to light, especially sun-light.

Anti-oxidant compounds include those known by the one skilled in the art, and, for example, are of the BHT-type (butylated hydroxytoluene) anti-oxidants, such as 2,6-di-tert-butyl-4-methylphenol.

Biocide compounds include those usually known and used in the art, and for example 2-methyl-4-isothiazoline-3-one (MIT) and 1,2-benzisothiozoline-3-one (BIT).

The inventors have surprisingly discovered that the bromine anion, typically bromine salt, present in the conductive fluid substantially reduces, or even avoid the corrosion of the plates and side walls of the optical electrowetting device, especially when these are made of glass and/or stainless steel, for example as compared with a conductive fluid comprising a chlorine anion.

According to another feature, the invention also relates to the use of a bromine anion, typically a bromine salt in the conductive fluid of an optical electrowetting device as non-corrosive agent, especially non-corrosive towards glass, stainless steel or both.

According to another feature, the non-conductive fluid and the conductive fluid have substantially the same density. This means it is acceptable that the difference of densities may vary within a short range. Typically, it is preferred the difference of densities is not more than about $3.10^{-3}$ g/cm$^3$ at 20° C.

When a bromine anion, typically bromine salt, is used in the conductive fluid, said bromine anion may also be useful for adjusting the density of said conductive fluid so that the difference between the density of the conductive fluid and that of the non-conductive fluid is within the above limit. Thus, and according to another feature, the invention also relates to the use of a bromine anion, typically a bromine salt in the conductive fluid of an optical electrowetting device as density-adjusting agent of the conductive fluid with respect to the density of the non conductive fluid.

According to another feature, the non-conductive fluid and the conductive fluid are transparent (as defined above) and each have a refractive index different from the other.

The difference of refractive index of the two fluids advantageously ranges from about ±0.03 to about ±0.8, preferably from about ±0.04 to about ±0.6, more preferably from about ±0.06 to about ±0.3.

In a preferred embodiment, the refractive index of the non-conductive fluid is greater than the refractive index of the conductive fluid.

In another aspect, the invention relates to an optical electrowetting device, especially an optical lens driven by electrowetting, comprising a multiphase liquid composition according to the invention.

In another aspect, the invention is related to an apparatus containing an optical electrowetting device according to the invention. In a feature, the apparatus comprises means to apply an A.C. (alternative current) or a D.C. (direct current) voltage, preferably an A.C. voltage to the conductive fluid.

The optical electrowetting device of the invention may be a variable focus liquid lens, an optical diaphragm, an optical zoom.

In still another aspect, the invention is related to a set or to an apparatus comprising an optical electrowetting device according to the invention, and a driver or similar electronic means for controlling the device. In an embodiment, an optical electrowetting device and the driver or similar electronic means are integrated in the apparatus. In another embodiment, the apparatus comprises several (more than one) optical electrowetting device(s) and at least one driver or similar electronic means. According to a feature, the driver comprises means to apply an A.C. or D.C. voltage, preferably an A.C. voltage, to the conductive fluid. The apparatus may be a camera, a cell phone, an endoscope, a telemeter, a dental video camera.

The present invention will now be described in further details by way of non-limiting examples and by reference to the attached drawings.

The invention is now described with the following examples which are presented as illustration of some specific embodiments and which are not intended to limit the scope of the invention, the scope of which is clearly defined in the appended claims.

ILLUSTRATIVE EXAMPLES

Example 1

Conductive Fluid Compositions

Unless otherwise specified, all % are weight %, and all characteristics are measured at 20° C.

Composition A (According to the Invention)

| | |
|---|---|
| Lithium bromine: | 1.5% |
| Mono propylene glycol: | 45% |
| Biocide: | 0.15% |
| Water: | Quantity to 100% |

Composition B (According to the Invention)

| | |
|---|---|
| Lithium bromine: | 6% |
| Mono propylene glycol: | 20% |
| Ethylene glycol: | 20% |
| Biocide: | 0.15% |
| Water: | Quantity to 100% |

Composition C (According to the Invention)

| | |
|---|---|
| Lithium bromine: | 6% |
| Mono propylene glycol: | 20% |
| Ethylene glycol: | 20% |
| Water: | Quantity to 100% |

Composition CF1 (Comparative Example)

| | |
|---|---|
| Sodium sulfate: | 0.2% |
| 1,2-propane diol: | 43.8% |
| 1,2,3-propane triol: | 22.2% |
| Biocide: | 0.03% |
| Water: | Quantity to 100% |

Example 2

Multi-Phase Compositions According to the Invention

Main Component of the Non Conductive Fluid

The following hydrocarbon compounds may be used in the non-conductive fluid:

decane ($C_{10}H_{22}$), dodecane ($C_{12}H_{24}$), squalane ($C_{30}H_{62}$); tert-butylcyclohexane ($C_{10}H_{20}$), α-chloronaphthalene, α-bromonaphthalene, cis,trans-decahydronaphthalene ($C_{10}H_{18}$), Isopar® V (Exxon Mobil), Isopar® P (Exxon Mobil), Non-Conductive Fluid Compositions:

Composition D

| | |
|---|---|
| SIP 6827 ® (ABCR GmbH): | 16.4% |
| DC 702 ® (mixture of cyclosiloxane and phenylated siloxanes, Dow Corning) | 58% |
| 1,8-dichlorooctane: | 25% |
| Antioxidant: | 0.6% |
| Density: | 1.0448 g/cm$^3$ |
| Refractive index: | 1.4905 |

Composition E

| | |
|---|---|
| Isopar ® V: | 19% |
| Chlorooctane: | 19.4% |
| p-bromoethylbenzene: | 61% |
| Antioxidant: | 0.6% |
| Density: | 1.0893 g/cm$^3$ |
| Refractive index: | 1.4915 |

Composition F

| | |
|---|---|
| Isopar ® V: | 35.2% |
| p-bromoethylbenzene: | 64.2% |
| Antioxidant: | 0.6% |
| Density: | 1.0890 g/cm³ |
| Refractive index: | 1.5010 |

Examples of Multi-Phase Compositions According to the Invention:

Multi-Phase Composition MP1:

| | |
|---|---|
| Conductive fluid | Composition A |
| Non-conductive fluid | Composition D |

Mean cinematic viscosity: 7.9 cSt (or mm²/s)

Multi-Phase Composition MP2:

| | |
|---|---|
| Conductive fluid | Composition B |
| Non-conductive fluid | Composition E |

Mean cinematic viscosity: 2.8 cSt (or mm²/s)

Multi-Phase Composition MP3:

| | |
|---|---|
| Conductive fluid | Composition B |
| Non-conductive fluid | Composition F |

Mean cinematic viscosity: 3.2 cSt (or mm²/s)

Other examples of multi-phase liquid compositions are given herein below:

Multi-Phase Composition MP4:

| Non-conductive fluid | | Conductive fluid | |
|---|---|---|---|
| Compound | Amount | Compound | Amount |
| SIP 6827 | 27.7% | NaBr | 0.50% |
| DC 702 | 40% | water | 48.5 |
| Phenyltrimethylgermane | 32.3% | EG | 12% |
| | | TMG | 38% |
| | | Pentanol | 1% | d (g/cm3): 1.0434　　　　d (g/cm3): 1.0447
n: 1.489　　　　　　　　n: 1.38895
viscosity (cSt): 4.5　　　　viscosity (cSt): 5.1
Δd (g/cm3): 0.0013
Δn: 0.10005
Average viscosity (cSt): 4.8

Multi-Phase Composition MP5:

| Non-conductive fluid | | Conductive fluid | |
|---|---|---|---|
| Compound | Amount | Compound | Amount |
| SIP 6823 (silane) | 21% | NaBr | 0.50% |
| DC 702 | 40% | water | 48.5 |
| Phenyltrimethylgermane | 39% | EG | 12% |
| | | TMG | 38% |
| | | Pentanol | 1% | d (g/cm3): 1.0411　　　　d (g/cm3): 1.0447
n: 1.50747　　　　　　　n: 1.38895
viscosity (cSt): 3.0　　　　viscosity (cSt): 5.1
Δd (g/cm3): 0.0036
Δn: 0.11852
Average viscosity (cSt): 4.1

Multi-Phase Composition MP6:

| Non-conductive fluid | | Conductive fluid | |
|---|---|---|---|
| Compound | Amount | Compound | Amount |
| SIP 6827.0 | 23.00% | NaBr | 0.50% |
| Phenyltrimethylgermane | 77.00% | Water | 49.50% |
| | | EG | 39.00% |
| | | MPG | 10.00% |
| | | Pentanol | 1.00% | d (g/cm3): 1.0578　　　　d (g/cm3): 1.0602
n: 1.48735　　　　　　　n: 1.38564
viscosity (cSt): 1.3　　　　viscosity (cSt): 4.0
Δd (g/cm3): 0.0024
Δn: 0.10171
Average viscosity (cSt): 2.7

Multi-Phase Composition MP7:

| Non-conductive fluid | | Conductive fluid | |
|---|---|---|---|
| Compound | Amount | Compound | Amount |
| Phenyltrimethylgermane | 66.00% | NaBr | 0.50% |
| DMS T15 | 14.00% | Water | 48.5 |
| SIP 6827.0 | 20.00% | EG | 12% |
| | | TMG | 38% |
| | | Pentanol | 1% | d (g/cm3): 1.0467　　　　d (g/cm3): 1.0447
n: 1.47536　　　　　　　n: 1.38895
viscosity (cSt): 2.5　　　　viscosity (cSt): 5.1
Δd (g/cm3): 0.002
Δn: 0.08641
Average viscosity (cSt): 3.8

Multi-Phase Composition MP8:

| Non-conductive fluid | | Conductive fluid | |
|---|---|---|---|
| Compound | Amount | Compound | Amount |
| DC 200/10 | 10.00% | NaBr | 5.00% |
| Phenyltrimethylgermane | 90.00% | water | 47.00% |
| | | EG | 47.00% |
| | | Pentanol | 1.00% | d (g/cm3): 1.09805　　　d (g/cm3): 1.1016
n: 1.4942　　　　　　　n: 1.3908
viscosity (cSt): 1.3　　　　viscosity (cSt): 3.8
Δd (g/cm3): 0.0031
Δn: 0.1034
Average viscosity (cSt): 2.5

Multi-Phase Composition MP9:

| Non-conductive fluid | | Conductive fluid | |
|---|---|---|---|
| Compound | Amount | Compound | Amount |
| DMS-T02 diphényldiméthylgermane | 34.00% 66.00% | NaBr water EG Pentanol 1-Hexanol | 2.50% 51.00% 45.30% 1.00% 0.20% |
| d (g/cm3): 1.0792 n: 1.5113 viscosity (cSt): 3.8 | | d (g/cm3): 1.0774 n: 1.3822 viscosity (cSt): 3.6 | |
| | | Δd (g/cm3): 0.0019 Δn: 0.1291 Average viscosity (cSt): 3.7 | |

Multi-Phase Composition MP10:

| Non-conductive fluid | | Conductive fluid | |
|---|---|---|---|
| Compound | Amount | Compound | Amount |
| Diphényldiméthylgermane Isopar P | 76.00% 24.00% | NaBr water EG Pentanol | 2.50% 48.50% 48.00% 1% |
| d (g/cm3): 1.0833 n: 1.5405 viscosity (cSt): 4.1 | | d(g/cm3): 1.0811 n: 1.3846 viscosity (cSt): 3.9 | |
| | | Δd (g/cm3): 0.0022 Δn: 0.1559 Average viscosity (cSt): 4.0 | |

Example 2

Turbidity Assay

Turbidity is measured using a HACH® 2100p turbidimeter, on 10 mL of fluid.

A multi-phase composition (conductive fluid+non-conductive fluid) is warmed at 85° C. for 18 hours (thermal stress).

The multi-phase composition is allowed to cool to room temperature (2 hours) after the thermal stress.

Each of the fluid is then assayed at various period of time for turbidity.

As an example, FIG. 1 illustrates the effect of the type of salt used in the conductive fluid on the turbidity of the non-conductive fluid:

Four multi-phase compositions of DC 704® and
1) CF1 (d=1.086)
2) Water alone
3) solution of LiBr in water (d=1.09, 13% in weight)
4) solution of $ZnBr_2$ in water (d=1.09, 9.9% in weight)

are submitted to a thermal stress as described above.

Turbidity of DC 704® is assayed for each multi-phase composition at various periods of time, up to 100 hours after thermal stress.

Transparence recovery is more rapid with multi-phase compositions having a conductive phase comprising a bromine salt, than those having pure water or even a sulfate salt as conductive phase.

The invention claimed is:

1. A method of making an optical electrowetting device, comprising:
   incorporating into an electrowetting structure a conductive fluid comprising a composition comprising water and from 0.5 weight % to 25 weight % of an organic or inorganic bromine salt.

2. The method of claim 1, wherein the electrowetting device comprises an optical lens driven by electrowetting.

3. The method of claim 1, wherein the bromine salt is selected from the group consisting of an alkali bromide an alkaline-earth bromide zinc bromide, mixtures thereof.

4. The method of claim 3, wherein the bromine salt is lithium bromide or sodium bromide.

5. The method of claim 1, wherein the conductive fluid has substantially no turbidity upon and after thermal stress.

6. The method of claim 1, wherein the bromine anion is added in an amount sufficient to provide a freezing-point lowering effect.

7. The method of claim 1, wherein the bromine anion is added in an amount sufficient to provide a non-corrosive effect.

8. The method of claim 1, wherein the optical electrowetting device comprises a conductive fluid and a non-conductive fluid that is immiscible in the conductive fluid, and wherein the bromine anion is added in an amount sufficient to provide a density-adjusting effect in the conductive fluid with respect to the density of the non conductive fluid.

9. A composition comprising water, from 0.5 weight % to 25 weight % of an organic or inorganic bromine salt and a freezing-point lowering agent.

10. The composition of claim 9 further comprising a viscosity-adjusting agent.

11. The composition of claim 9 further comprising a biocide agent.

12. The composition of claim 9 comprising:
   5 weight % to 60 weight % of a freezing-point lowering agent;
   0 weight % to 50 weight % of a viscosity-adjusting agent;
   0 weight % to 1 weight % of a biocide agent; and
   water in a quantity sufficient to 100 weight %.

13. The composition of claim 9 comprising:
   1.0 weight % to 20 weight % of a bromine salt;
   10 weight % to 50 weight % of a freezing-point lowering agent;
   0 weight % to 40 weight % of a viscosity-adjusting agent;
   0 weight % to 0.5 weight % of a biocide agent; and
   water in a quantity sufficient to 100 weight %.

14. A multi-phase liquid composition comprising a conductive fluid and a non-conductive fluid that is immiscible in the conductive fluid, wherein the conductive fluid comprises a composition comprising water and from 0.5 weight % to 25 weight % of a bromine salt.

15. The multi-phase composition of claim 14, wherein the conductive fluid further comprises a freezing-point lowering agent.

16. The multi-phase composition of claim 14, wherein the non-conductive fluid being immiscible in the conductive fluid, the multi-phase composition has a cinematic viscosity of between 1.5 cSt and 40 cSt, within the temperature range of −20° C. to +70° C.

17. The multi-phase composition of claim 16, having a cinematic viscosity of between 1.5 cSt and 20 cSt, within the temperature range of −20° C. to +70° C.

18. The multi-phase composition of claim 14, wherein the difference of viscosity between the conductive fluid and the non-conductive fluid is comprised between 0 cSt and ±10 cSt, within the temperature range of −20° C. to +70° C.

19. An optical electrowetting device comprising a conductive fluid and a non-conductive fluid that is immiscible in the conductive fluid, wherein the conductive fluid comprises composition comprising water and from 0.5 weight % to 25 weight % of a bromine salt.

20. The optical electrowetting device of claim 19, wherein the conductive fluid further comprises a freezing-point lowering agent.

21. The optical electrowetting device of claim 19 that is variable focus liquid lens, or an optical diaphragm, an optical zoom.

22. The optical electrowetting device of claim 19 which is a lens driven by electrowetting.

23. An apparatus comprising an optical electrowetting device of claim 19 and a driver or electronic means for controlling the interface.

24. The apparatus of claim 23, which is a camera, a cell phone, an endoscope, a telemeter or a dental video camera.

\* \* \* \* \*